United States Patent
Price et al.

(10) Patent No.: US 8,850,512 B2
(45) Date of Patent: Sep. 30, 2014

(54) SECURITY ASSESSMENT OF VIRTUAL MACHINE ENVIRONMENTS

(75) Inventors: Michael Price, Santiago (CL); Anthony Bettini, San Francisco, CA (US)

(73) Assignee: McAfee, Inc., Santa Clara, CA (US)

( * ) Notice: Subject to any disclaimer, the term of this patent is extended or adjusted under 35 U.S.C. 154(b) by 231 days.

(21) Appl. No.: 13/272,484

(22) Filed: Oct. 13, 2011

(65) Prior Publication Data

US 2013/0247133 A1  Sep. 19, 2013

(51) Int. Cl.
*H04L 29/06* (2006.01)

(52) U.S. Cl.
USPC .......... 726/1; 718/1; 726/12; 726/22; 726/23; 726/24; 713/164; 713/165; 713/166

(58) Field of Classification Search
USPC ........... 718/1; 726/1, 12, 22, 23, 24; 713/164, 713/165, 166
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 7,532,571 B1 | 5/2009 | Price et al. | |
| 8,225,317 B1* | 7/2012 | Chiueh et al. | 718/1 |
| 2006/0136720 A1* | 6/2006 | Armstrong et al. | 713/164 |
| 2008/0320583 A1* | 12/2008 | Sharma et al. | 726/12 |
| 2011/0106569 A1 | 5/2011 | Price | |
| 2011/0125648 A1 | 5/2011 | Price et al. | |

* cited by examiner

*Primary Examiner* — Brian Shaw
(74) *Attorney, Agent, or Firm* — Patent Capital Group (57) ABSTRACT

Each virtual machine in a set of virtual machines managed by the virtual machine manager is identified. For each virtual machine in the set, it is determined whether the respective virtual machine is online. For at least the virtual machines determined to be offline, a machine image is collected for each offline virtual machine. Security of the offline virtual machines is assessed from the collected images. For virtual machines identified as online, an agent is loaded on each online virtual machine in the set via the virtual machine manager. The loaded agents are used to assess security of the online virtual machines in the set.

19 Claims, 8 Drawing Sheets

Reports: Vulnerabilities By IP Report

File  Edit  View  Favorites  Tools  Help file:///C:/Program%20Files/Reports/Reports/VixFsI6

Reports: Vulnerabilities By IP

Vulnerabilities By IP

Page 1 of 1    <<    <    1    >    >>    Rows: 1

510 — DNS Name:[Unknown] | 123.456.7.8 | [[Unknown]]    Criticality: None

505 — (VIX) (MS 10-066) Vulnerability In Remote Procedure Call Could Allow Remote Code Execution (982802)    MEDIUM Description:
515 — An unauthenticated remote code execution vulnerability exists in Microsoft Windows.

Response From System:

520 — 
[ha-datacenter/datastore1] Microsoft Windows XP SP3 x86 00/Microsoft Windows XP SP3 x86 00.vmx | Microsoft Windows Server 2003 | not_set | C:\WINDOWS\system32 \rpcrt4.dll | 5.2.432.1 | 5.2.432.123

[ha-datacenter/datastore1] Microsoft Windows XP SP3 x86/Microsoft Windows XP SP3 X86.vmx | Microsoft Windows XP | Service Pack 3 | C:\WINDOWS\system32 \rpcrt4.dll | 5.1.567.8 | 5.1.567.123

Recommendation:
525 — The vendor has released an update to address this issue http://www.microsoft.com/technet/security/bulletin/ms10-066.

SECURITY ASSESSMENT OF VIRTUAL MACHINE ENVIRONMENTS

TECHNICAL FIELD

This disclosure relates in general to the field of computer security and, more particularly, to performing security tasks on virtual machines.

BACKGROUND

The Internet has enabled interconnection of different computer networks all over the world. The ability to effectively protect and maintain stable computers and systems, however, presents a significant obstacle for component manufacturers, system designers, and network operators. This obstacle is made even more complicated due to the continually-evolving array of tactics exploited by malicious software authors. Malicious software authors create malicious software ("malware") to disrupt or stop computer operations, steal information, gain unauthorized access to system resources, and conduct other unauthorized abusive, hostile, intrusive, or annoying activities. Malware continues to evolve with new malware objects being developed potentially exposing computers and systems every day.

System administrators and security product providers have developed a number of malware detection, security assessment, firewalls, security policy enforcement tools, and other security products for monitoring, scanning, and protecting computing systems against malware, viruses, and other threats. As security products mature to more satisfactorily meet the challenges present in more traditional personal computing and enterprise computing environments, accessing and using computing assets evolve introducing new challenges for security administrators, product and service providers. For instance, cloud computing has emerged as a popular alternative to maintaining a dedicated set of hard computing assets, allowing individuals and enterprises to access supplemental and scalable computing assets temporarily and on-demand. The use of virtual environments realized using cloud computing infrastructure are also expanding, including the use of virtual machines in cloud and server pool environments that can be selectively turned "on" as needed in connection with the temporary scaling up of a particular computer system or a user's computing needs.

BRIEF DESCRIPTION OF THE DRAWINGS

Like reference numbers and designations in the various drawings indicate like elements.

DETAILED DESCRIPTION OF EXAMPLE EMBODIMENTS

Overview

In general, one aspect of the subject matter described in this specification can be embodied in methods that include the actions of identifying each virtual machine in a set of virtual machines managed by a virtual machine manager. It can be determined, for each virtual machine in the set, whether the respective virtual machine is online. A machine image can be collected for each virtual machine in the set via the virtual machine manager. Security of the offline virtual machines can be assessed from the collected images.

In another general aspect of the subject matter described in this specification, a system can include a memory element storing data, a processor operable to execute instructions associated with the stored data, and a security assessment module. The security assessment module can be configured to identify each virtual machine in a set of virtual machines managed by a particular virtual machine manager, determine, for each virtual machine in the set of virtual machines, whether the respective virtual machine is online, load, via an API of the virtual machine manager, an agent on each virtual machine in the set of virtual machines determined to be online, and use the agent to assess security of the at least one online virtual machine.

These and other embodiments can each optionally include one or more of the following features. A query can be sent to the virtual machine manager for information for the set of virtual machines. Identification data can be received from the virtual machine manager identifying each virtual machine in the set of virtual machines in response to the query. The identification data can include identification, for each virtual machine in the set of virtual machines, of whether the virtual machine is online. At least one of the query or identification data can be communicated over an API of the virtual machine manager. The machine images of offline virtual machines in the set can be sent via an API of the virtual machine manager. An agent can be loaded, via an API of the virtual machine manager, on at least one online virtual machine in the set. The agent can be used to assess security of the at least one online virtual machine. Result data can be collected that reports results of the security assessment of the at least one online virtual machine, and the result data can be collected from the agent over the API of the virtual machine manager. The agent can be removed automatically at conclusion of the security assessment of the at least one online virtual machine. The set can be a subset of the plurality of virtual machines managed by the virtual machine manager and the set can include less than all of the plurality of virtual machines.

Further, these and other embodiments can each optionally include one or more of the following features. Result data can be collected from the security assessment of the offline virtual machines. The offline virtual machines can include a plurality of offline virtual machines and the result data can describe virtual-machine-specific security conditions for each of the plurality of offline virtual machines. A virtual-machine-specific report can be generated for each of the plurality of offline virtual machines based at least in part on collected result data. Assessing security of the offline virtual machines from the collected images can include reading each image file to identify security characteristics of each virtual machine in the offline virtual machines. Assessing security of the offline virtual machines from the collected images can include simulating operation of each offline virtual machine based on data in the corresponding image of the respective virtual machine. The plurality of virtual machines can be firewalled. A security assessment toll can be authenticated at the virtual machine manager. The security assessment of the offline virtual machines can include remedying at least one of a security vulnerability or policy violation detected for a particular one of the offline virtual machines before the particular virtual machine resumes online operation. The security assessment module can collect, for each virtual machine in the set determined to be offline, a machine image of the virtual machine via the particular virtual machine manager, and assess security of the offline virtual machines from the collected machine images.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

EXAMPLE EMBODIMENTS

Figure 1:
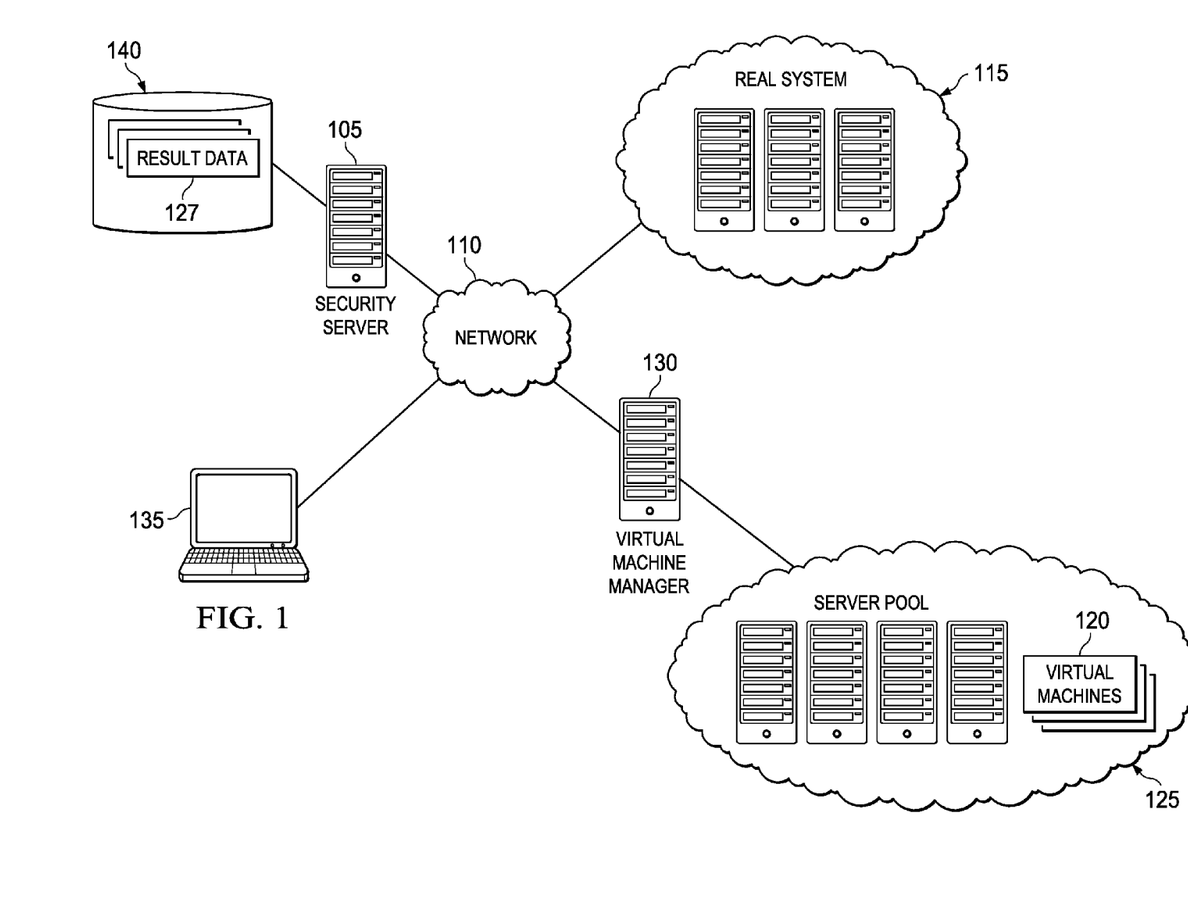
FIG. 1 is a simplified schematic diagram of a system including a plurality of virtual resources and a virtual machine manager in accordance with one embodiment.

FIG. 1 is a simplified block diagram illustrating an example embodiment of a computing system 100 including one or more security tools 105 adapted to perform one or more computer security tasks on computing assets and appliances, including scans in connection with policy compliance, vulnerability assessment, malware protection, and other security services. In some instances, security tasks can be performed using security tool 105 on remote assets and appliances over one or more networks 110, including "real" (i.e., non-virtual) system assets and appliances (e.g., at 115) and virtual assets and appliances, such as virtual machines 120 hosted by servers in a server pool 125, such as a cloud computing system. One or more virtual machine managers (e.g., 130) can be provided in connection with hosts of virtual assets and appliances and can provide administrators and customers with interfaces for deploying, maintaining, and otherwise managing virtual machines hosted within the server pool or cloud environment. Additionally, one or more client computing devices (e.g., 135) can be provided and adapted to communicate with other devices in the system 100, for instance, over network 120.

Security server 105 can perform one or more computer security tasks on one or more local and/or remote computing devices and systems to assist in securing customer computing devices from threats and enforcing security policies. For instance, security server 105 can serve or otherwise provide one or more software-based security tools including vulnerability assessment tools, malware detection tools, malware removal tools, firewall management tools, policy compliance tools, policy enforcement tools, among other examples. Result data 140 can be generated from security tasks performed using security server 105 and related tools. Such result data 140 can provide detailed information describing conditions and context for various issues, alerts, scans, and other results generated during one or more security tasks to assist administrator users in understanding security conditions of their machines and systems.

Security server 105 can perform one or more computer security tasks on local computing assets, including computer devices, software, and peripherals. Indeed, in some instances, security server 105 can comprise a software-based security tool installed on one or more computing devices, including personal computing devices. In other instances, security server 105 can perform computer security tasks on remote computing devices and assets. In some instances, security server 105 can include multiple server devices providing computer security services to multiple customers and computing devices. Security tasks can be performed on real computing systems and assets (e.g., assets of system 115), including computing assets including real hardware and accompanying software executed using the hardware. In addition to performing tasks on real computing infrastructure and assets, security server 105 can also be used to perform security tasks on virtual computing infrastructure, such as virtual appliances (e.g., 120) hosted on one or more local and/or remote computing devices, such as computing devices in a cloud computing environment or on-demand server pool (e.g., system 125).

In some instances, virtual computing infrastructure can be provided or hosted by for example in cloud computing environments, including by cloud computing providers such as Amazon Web Services, Citrix Xen systems, or the Google App Engine, among many others. Alternatively, such virtual infrastructure can also (or alternatively) be hosted within an entity's direct or extended premises and computing pools using solutions such as VMware's ESX, Microsoft's Hyper-V, Citrix's Xen, among many others. Computing applications, software systems and other assets, including enterprise applications and software systems are increasingly being moved to virtual infrastructure, mostly for economic reasons. Virtual infrastructure and virtual appliances can be implemented as virtual machines. Virtual machines can include software implementations or virtualizations of a physical machine (i.e., computing device) executing particular operating systems (i.e., guest operating systems) and applications as if it were a real, physical computer. Virtual machines can be isolated software containers, operating independent of other virtual machines. Such isolation can assist in realizing virtual-machine-based virtual environments that can execute applications and provide services with availability, flexibility, and security, in some cases, surpassing those on traditional, non-virtualized systems. Virtual machines can encapsulate a complete set of virtual hardware resources, including an operating system and all its applications, inside a software package. Encapsulation can make virtual machines quite portable and manageable. Indeed, virtual machines can be hardware-independent, and can be portably provisioned and deployed on one of multiple different computing devices, operating systems, and environments. Indeed, depending on the availability of computing devices within a cloud environment (e.g., 125) a particular virtual machine 120 can be provisioned on any one (or multiple) of the devices included in cloud environment 125.

In some instances, a virtual machine manager 130 can be provided in connection with a cloud computing system (e.g., 125) (or other system hosting virtual infrastructure). Virtual machine managers 130, or hypervisors, can be implemented as software- and/or hardware-based tools used in the virtualization of hardware assets (i.e., as virtual machines 120) on one or more host computing devices (e.g., system 125). A virtual machine manager 130 can be used to run multiple virtual machines (e.g., 120), including virtual machines with different guest operating systems, on one or more host computers (e.g., 125). The virtual machine manager 120 can provide a shared virtual operating platform for multiple virtual appliances and guest operating systems and enable a plurality of different virtual machines (and guest operating systems) to be instantiated and run on computing devices and hardware hosting virtual infrastructure. Further, virtual machine managers 130, in some instances can be run natively, or as "bare metal," directly on host computing devices' hardware to control the hardware and to manage virtual machines provisioned on the host devices. In other instances, "hosted" virtual machine managers 130 can be provided that are run within the operating system of another host machine, including conventional operating system environments.

Virtual machine managers 130 can also provide multiple interfaces, including interfaces for providing cloud computing (or infrastructure virtualization) as a service (e.g., IaaS). Virtual machine manager 130 interfaces can include interfaces and application programming interfaces (APIs) that can provide operations and accessing including guest management, offline registry access, virtual disk access, and other features of virtual machines that maybe running or accessible through a particular virtualization host environment. As an example, a virtual machine manager associated with VMware™ virtualization tools can include such interfaces as the VIX API and VDDK API, among others. Further, virtual machine manager-provided interfaces can be leveraged, in some instances, in connection with the performance of computer security tasks on virtual machines and guest operating services hosted on computing devices in a corresponding virtualization environment (e.g., 125), to allow outside security tools (e.g., 105) access to firewalled and other protected virtualized appliances and resources.

In general, "servers," "clients," "computers," and "computing devices" (e.g., 105, 115, 125, 130, 135) can comprise electronic computing devices operable to receive, transmit, process, store, or manage data and information associated with the software system 100. As used in this document, the term "computer," "computing device," "processor," or "processing device" is intended to encompass any suitable processing device. For example, the system 100 may be implemented using computers other than servers, including server pools. Further, any, all, or some of the computing devices may be adapted to execute any operating system, including Linux, UNIX, Windows Server, etc., as well as virtual machines adapted to virtualize execution of a particular operating system, including customized and proprietary operating systems.

Servers, clients, and computing devices (e.g., 105, 115, 125, 130, 135) can each include one or more processors, computer-readable memory, and one or more interfaces. Servers can include any suitable software component or module, or computing device(s) capable of hosting and/or serving software applications and other programs, including distributed, enterprise, or cloud-based software applications. For instance, application servers can be configured to host, serve, or otherwise manage web services or applications, such as SOA-based or enterprise web services, or applications interfacing, coordinating with, or dependent on other applications or services, including security-focused applications. In some instances, some combination of servers can be hosted on a common computing system, server, or server pool, and share computing resources, including shared memory, processors, and interfaces, such as in an enterprise software system serving services to a plurality of distinct clients and customers.

Computing devices (e.g., 105, 115, 125, 130, 135) in system 100 can also include devices implemented as one or more local and/or remote client or endpoint devices, such as personal computers, laptops, smartphones, tablet computers, personal digital assistants, media clients, web-enabled televisions, telepresence systems, and other devices. A client or endpoint devices (e.g., 135) can include any computing device operable to connect or communicate at least with servers, other endpoint devices, network 120, and/or other devices using a wireline or wireless connection. Each endpoint device can include at least one graphical display device and user interfaces, allowing a user to view and interact with graphical user interfaces of computer security tools and other software. In general, endpoint devices can include any electronic computing device operable to receive, transmit, process, and store any appropriate data associated with the software environment of FIG. 1. It will be understood that there may be any number of endpoint devices associated with system 100, as well as any number of endpoint devices external to system 100. Further, the term "client," "endpoint device," and "user" may be used interchangeably as appropriate without departing from the scope of this disclosure. Moreover, while each endpoint device may be described in terms of being used by one user, this disclosure contemplates that many users may use one computer or that one user may use multiple computers.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Traditional vulnerability assessment tools tend to ignore the scanning of powered-off virtual appliances and offline images. In many enterprises, vulnerability assessment and/or scanning, is typically carried out during pre-set "scan windows." For instance, a financial institution may want to ensure that no scanning takes place during market hours because scanning is perceived as having the possibility to affect operations. Accordingly, such an institution may elect to limit scanning of its computing resources during scan windows so that some or all of its systems are scanned during times that would not interfere with operation or other institutional goals.

With the boom in virtual infrastructure, a problem has emerged in vulnerability assessment services, as virtual infrastructure, in many instances, is programmatically powered down and only in-use, in some cases, for short periods of time, which in many instances do not overlap with the scan window periods. For instance, a biotech firm that is using virtual infrastructure to perform DNA sequencing or a graphic design firm doing intensive 3D rendering/modeling may only temporarily access and "turn on" virtual computing infrastructure during tasks and periods where peak processing capacity is desired or needed. As virtual infrastructure can be priced based on the amount of time virtual infrastructure is used, excess computing resources provided by virtual infrastructure is typically "turned off" when it is not needed, among other reasons for periodically powering-on and -off virtual infrastructure.

Traditional security tools treat powered-on virtual appliances the same as non-virtual, real endpoints, hosts, and appliances during scanning. Typically, virtual infrastructure and real infrastructure are scanned by traditional security tools and reported to the customer the same way (i.e., without differentiating between virtual appliances and real appliances). Further, performing security tasks on remotely hosted virtual infrastructure can be difficult, as virtual machine managers often maintain, or otherwise manage, firewalls and other barriers between the hosts and outside computing devices making the backend hosting the virtual infrastructure less transparent to outside security tools.

Computing system 100, in some implementations, can resolve many of the issues identified above pertaining to the security of virtual infrastructure and can be configured to scan offline virtual appliances, including those virtual appliances which had already been powered down, for vulnerabilities and policy compliance violations. Additionally, security tools can be configured to integrate with APIs of virtual machine managers to access and scan online and offline virtual appliances for vulnerabilities and policy compliance violations. As an example, turning to the schematic representation 200 of FIG. 2, a computer security tool 205, including at least one processor 210 and memory 215, can be provided with modules 220, 225 for performing various computer security tasks on real hardware and computing assets hosted by the real hardware (i.e., module 220) as well as on virtual machines (i.e., module 225). A task manager 230 can also be provided for managing and providing logic in connection with the one or more computer security tasks the security tool 205 is adapted to perform on various computing assets. A reporting engine 235 can also be provided adapted for generating, presenting, and otherwise managing reporting data generated from result data collected in connection with computer security tasks performed by the security tool 205.

Figure 2:
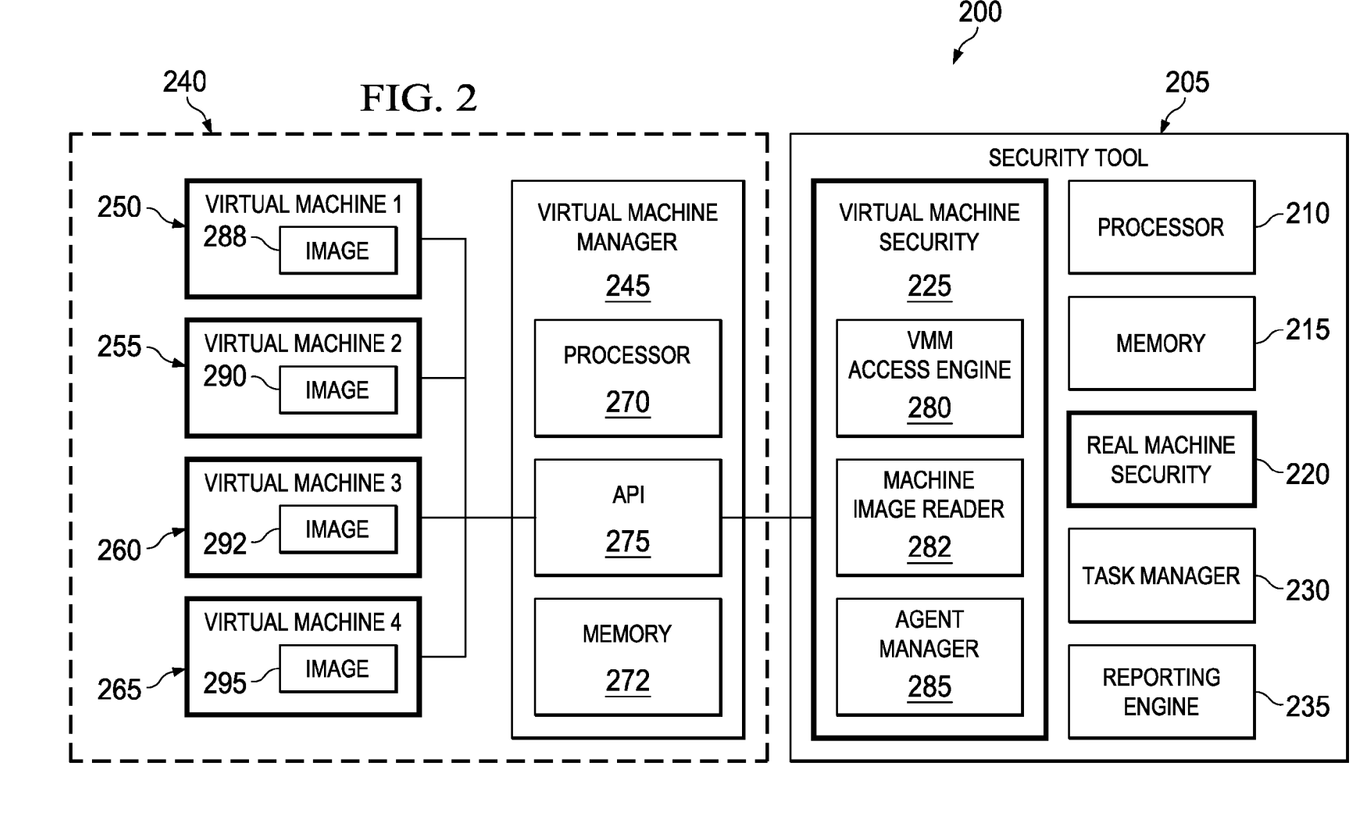
FIG. 2 is a simplified block diagram of an example system including an example security tool for performing one or more security tasks relating to virtual resources in accordance with one embodiment.

In the example of FIG. 2, computer security tool 205 can perform security tasks on virtual infrastructure hosted in a system 240. The system 240 can include one or more virtual machine managers 245 managing and coordinating a plurality of virtual machines 250, 255, 260, 265 (and corresponding guest operating systems) hosted on one or more real machines in system 240. Virtual machine manager 245 can itself include at least one processor 270 and memory 272, as well as one or more interfaces (e.g., 275) allowing access to one or more of the plurality of virtual machines 250, 255, 260, 265 as well as resources thereof, such as registries and images (e.g., 288, 290, 292, 295) of the respective virtual machines 250, 255, 260, 265 and/or guest operating systems thereof. Security tool 205 can perform security tasks on the virtual infrastructure using virtual machine security module 225. The virtual machine security module can include a virtual machine manager (VMM) access engine 280, machine image reader 282, agent manager 285, among other engines, modules, and sub-modules and/or combinations of the foregoing.

In one example implementation, virtual machine security module 225 can integrate the security tool 205 with interfaces (e.g., 275) of the virtual machine manager 245 to authenticate and/or authorize the security tool 205 with system 240. Security tool 205 can then request, receive, and identify information about virtual machines 250, 255, 260, 265 through the interfaces 275 of the virtual machine manager 245. For instance, security tool 205 can enumerate each virtual machine hosted in system 240 for a particular customer, thereby developing a set of virtual appliances for which one or more security tasks can be performed. Additionally, information can be obtained using VMM access engine 280 identifying the status and location (e.g., IP or MAC address) of each enumerated virtual machine in system 240, including whether a respective virtual machine is online (i.e., turned "on," actively provisioned, and/or operational, etc.) or offline (i.e., turned "off").

Virtual machine security module 225 can use information obtained over the virtual machine manager interfaces 275 (e.g., using VMM access engine 280) to determine how to perform one or more security tasks (e.g., in cooperation with task manager 230) on a respective enumerated virtual machine. For instance, in some examples, if it is determined that a particular virtual machine is offline, security tasks may not be able to be performed on a live instantiation of the virtual machine (i.e., its offline and not operating). Security tasks may nonetheless be able to be performed on the offline virtual machine by accessing one or more machine images (e.g., 288, 290, 292, 295) and registry data from the virtual machine describing attributes of the virtual machine. In some implementations, a machine image reader 282 can be provided for parsing data in retrieved virtual machine images to determine attributes of a virtual machine that can be scanned, checked, and verified in accordance security tasks performed by the security tool 205. Indeed, in some implementations, running of online simulations or approximate clones of an offline virtual machine may be able to be generated from retrieved images using machine image reader 282. Security tasks can be performed on the generated running simulation of the offline virtual machine to generate substantially trustworthy results documenting the security status of the offline virtual machine.

In instances where an enumerated virtual machine is identified as being currently online, virtual machine manager interfaces 275 can be further leveraged to load agents onto online virtual machines for use in connection with various security tasks. Agent manager 285 can be used to generate, load, and manage operation of agents loaded onto running virtual machines over interface 275 and perform various security tasks using the agents. Agents themselves can be implemented as binary executables including logic for checking system settings, registry key values, file attributes or contents, and other features, characteristics, and settings. In one example, an agent can include a list of registry key values and file attributes to check for, in order to determine the presence or absence of a particular security fix or countermeasure. For example, if a security fix updates a file, and a virtual machine is tested through the use of an agent, and the agent finds the file but determines that the version of the file is older than the known fixed version, then the agent can produce a result indicating that the target is vulnerable. The agent can then place results into a file on the virtual machine, which could then be retrieved by the security tool using a virtual machine manager interface/API designed to allow copying of files from virtual machines back to remote systems.

Reporting data can be generated (e.g., using reporting engine 235) documenting the outcome of security tasks performed by security tool 205. Reporting data can identify the computing devices and appliances, both real and virtual, upon which the security task was performed along with appliance-specific reporting data from the task. Among the advantages, generating appliance-specific reporting data can assist in appropriately assigning service tickets and reporting data to responsible administrators. Operational responsibility can be an important component in the usability of vulnerability assessment software and solutions. For instance, when a large enterprise customer uses a vulnerability assessment or other computer security service scanning the hundreds of thousands of assets belonging to the enterprise, reporting data generated from the scans can be delivered to the enterprise's administration team. In some solutions, the administration team may receive a large report of vulnerabilities and policy compliance violations identified during the scans. The enterprise's security administration team may then attempt to assign particular violations to particular teams or asset owners. For instance, in one particular example, teams may include teams responsible for assets managed or served by Microsoft Windows servers while other teams are responsible for Oracle database servers, among other examples. As an Oracle database may in fact run on a Microsoft Windows server, enterprise administrators may find it difficult to assign the right tickets or actions to the right team or teams. Accordingly, the more granularity that a vulnerability assessment or other computer security tool can provide about the scan and the target of the scan, the more information and better decision-making power (both programmatic and manual) can be provided and leveraged by customers. Further, a solution that is also capable of identifying whether detected vulnerabilities or policy compliance violations occurred on virtual (or non-virtual, "hard" infrastructure), such as the example solutions described herein, can assist in providing additional granularity to reporting and result data returned from security tools, allowing users to make still better decisions about how to remedy such violations. For instance, result data collected by security tool 205 can differentiate between attributes, issues, and conditions found on a guest virtual machine hosted by a host server device and attributes, issues, and conditions found on the host server device itself.

FIGS. 3A-3C and 4 illustrate the performing of example security tasks on virtual machines and other resources. For instance, in FIG. 3A, a schematic representation 300a is shown illustrating a security server 305 performing security tasks on virtual machines 310, 315, 320, 325 hosted in a system employing a virtual machine manager 330. In the examples of FIGS. 3A-3C and 4, devices hosting virtual machines 310, 315, 320, 325 may be remote from security server 305, and security server 305 may attempt to access and provide security services over one or more networks 340. Further, in the examples of FIGS. 3A-3C and 4, security server 305 may not be permitted direct access to virtual machines 310, 315, 320, 325, for instance, due to the presence of firewalls (e.g., 345) and other measures used to secure virtual machines 310, 315, 320, 325.

Additionally, in performing security tasks on virtual machines 310, 315, 320, 325, security server 305 can employ different approaches to scanning, checking, and otherwise accessing data relating to the virtual machines 310, 315, 320, 325 depending, at least in part, on whether a respective virtual machine is online (e.g., virtual machines 310, 320) or offline (e.g., virtual machines 315, 325). Accordingly, in FIG. 3A, an example security server 305 can interface with virtual machine manager 330 to collect data describing a set of virtual machines 310, 315, 320, 325 hosted in a system. In some instances, security server 305 can authenticate to virtual machine manager 330 to integrate with interfaces of the virtual machine manager 330 and gain access to the set of virtual machines 310, 315, 320, 325. In some instances, virtual machine manager 330 can manage a plurality of virtual machines of which the set of virtual machines 310, 315, 320, 325 is but a subset. Further, in some instances, authentication (and/or authorization) of the security server 305 can be limited to a particular set or sets of virtual machines hosted among the plurality of virtual machines. For example, a cloud computing service (corresponding to virtual machine manager) can host virtual machines for a large number of customers and security server 305 may be providing security services for only a subset of those customers. Accordingly, security server's 305 access to virtual machines in the system can be restricted, in some examples, to a subset of virtual machines to which it is authorized to access. Further, security server 305 can request and obtain, through virtual machine manager 330 and/or interfaces of virtual machine manager 330, data 335 listing the virtual machines in a requested set, together with other information describing the virtual machines. Such information can include an indication of whether the virtual machine is online or offline, its location within the system, the guest operating system (if any) employed on the virtual machine, among other information.

Figure 3A:
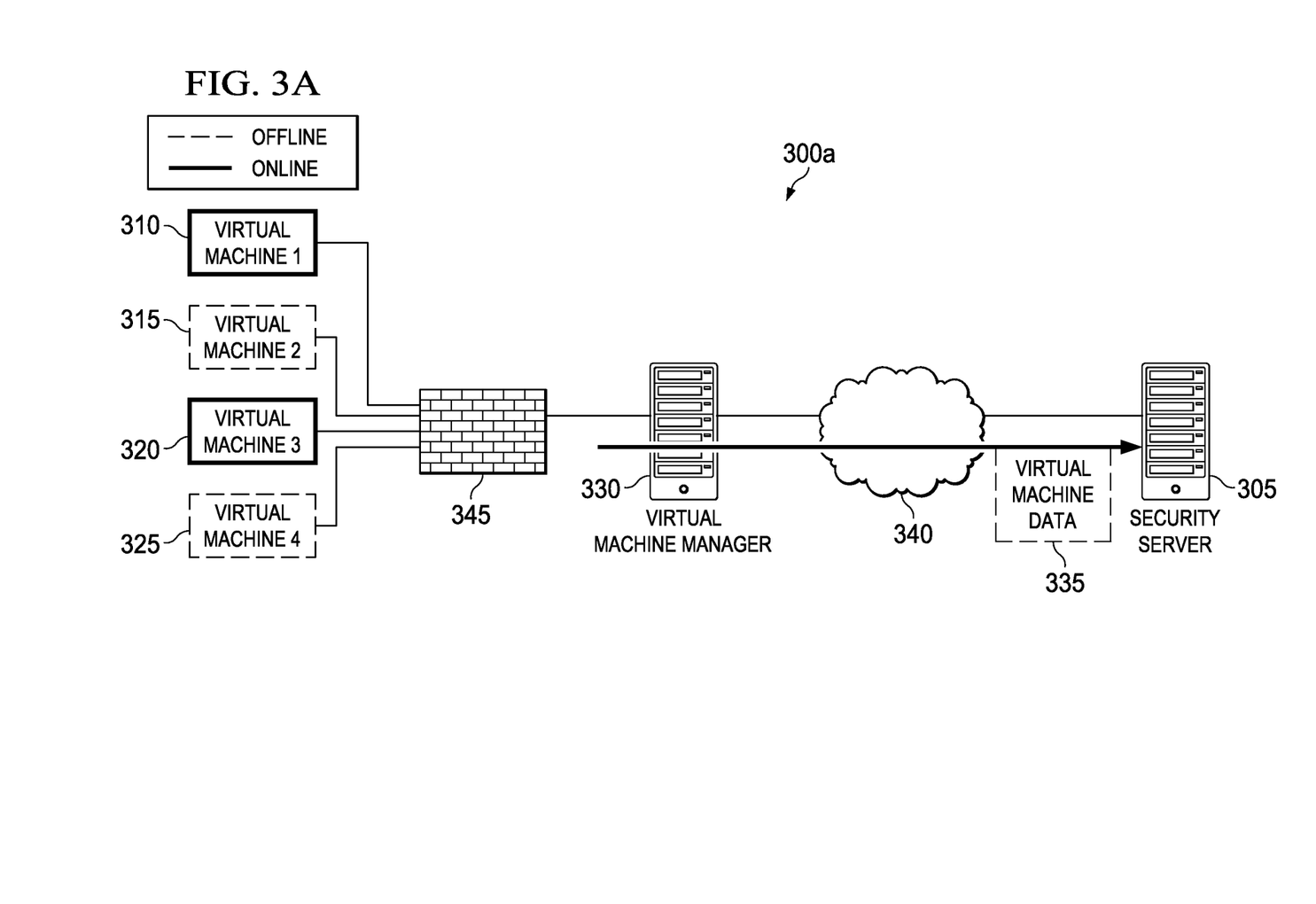
FIGS. 3A-3C illustrate examples of performing example security tasks on virtual resources in accordance with at least some embodiments.
Figure 3B:
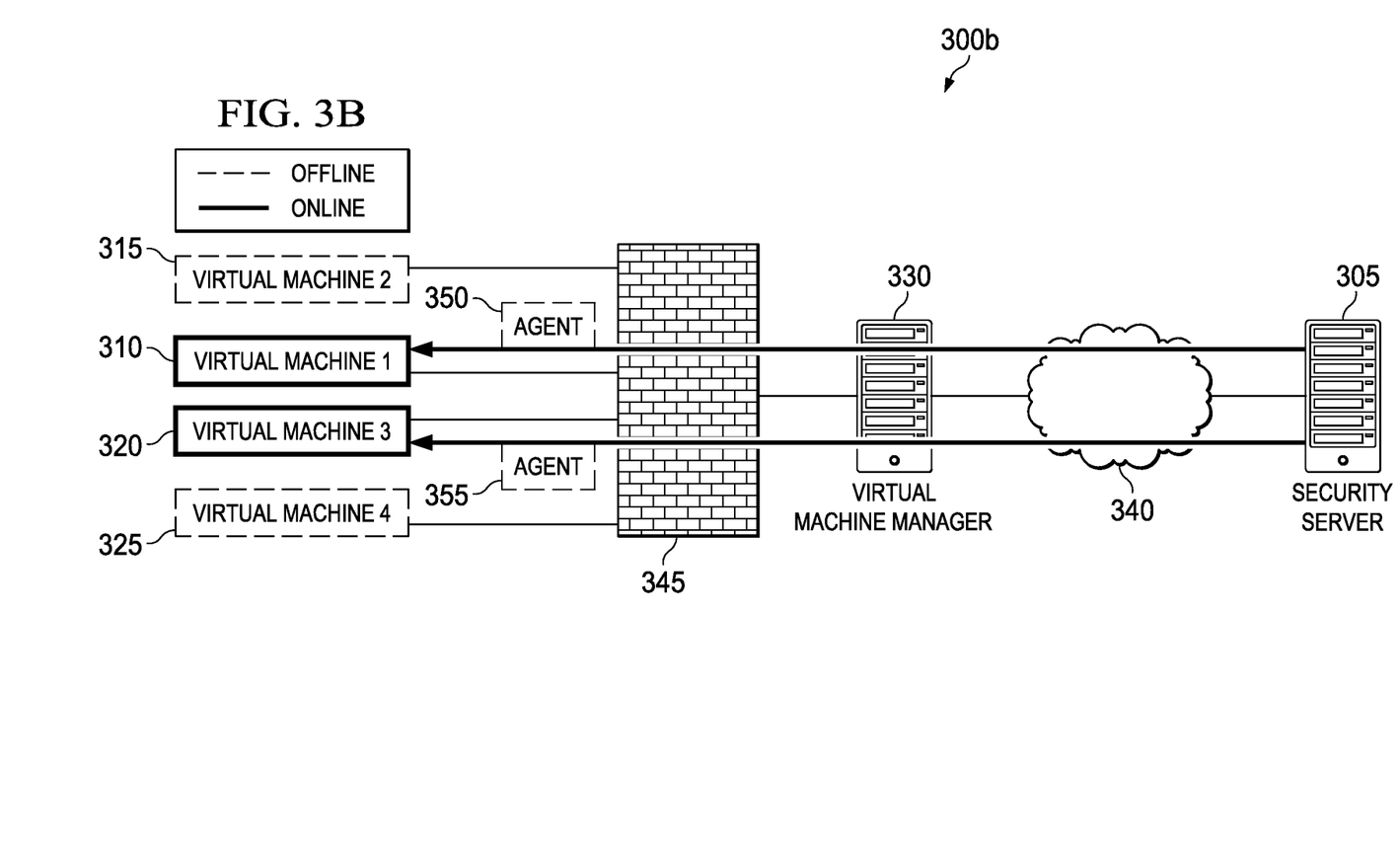

Data 335 returned from virtual machine manager 330 can be used to determine which security tasks to perform on which virtual machines 310, 315, 320, 325, as well as how such security tasks are to be performed. For instance, in FIG. 3B, upon determining that virtual machines 310 and 320 are online and that virtual machines 315 and 325 are offline, a first security task can be initiated that includes scanning online virtual machines 310, 320. In the example of FIG. 3B, security server 305 can obtain the identity and locations of virtual machines 310, 320 and load agents 350, 355 onto the virtual machines 310, 320. In some instances, agents can be loaded based on the guest operating system of the respective virtual machine. For instance, virtual machine 1 310 may have a different guest operating system than virtual machine 3 320, and different agents 350, 355 may be identified and loaded onto each virtual machine in accordance with the virtual machine's guest operating system.

Figure 3C:
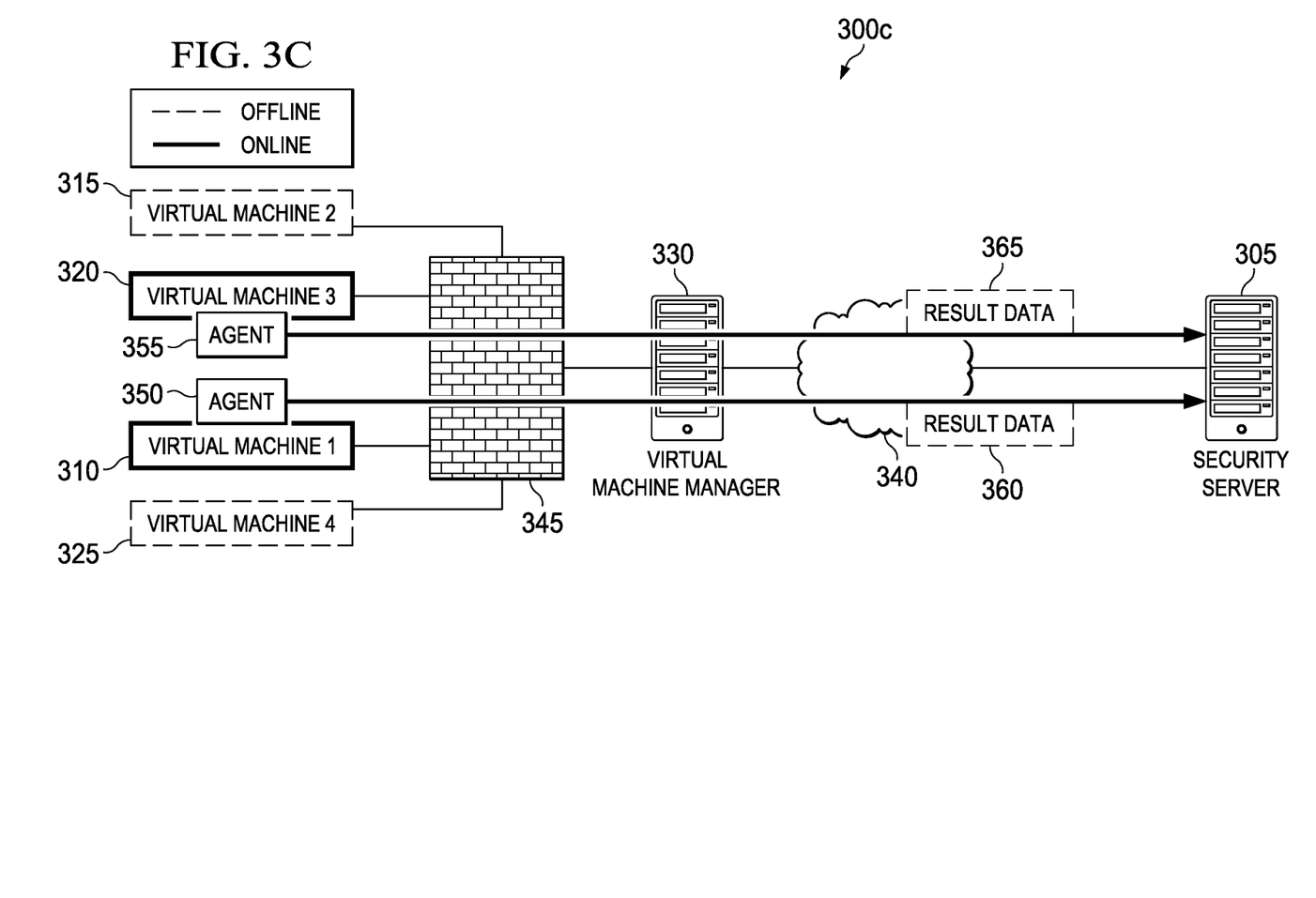

Turning to FIG. 3C, upon loading agents 350, 355 on identified online virtual machines 310, 320, agents 350, 355 can scan resources of virtual machines 310, 320 respectively and perform other relevant operations in connection with the one or more security tasks to be performed on virtual machines 310, 320. Result data 360, 365 can be generated by the agents 350, 355 and returned to security server 305 (e.g., over virtual machine manager interfaces) describing outcomes of the individual tasks performed on each of virtual machines 1 (310) and 3 (320). Once the tasks have been performed according to logic included in the agent (such as provided by a security task manager (e.g., 230) used to build a particular agent) and result data 360, 365 has been delivered to security server 305, agents 350, 355 can "dissolve," automatically uninstall, or be torn down, commensurate with the end of the security task.

In one illustrative example, a memory corruption vulnerability security task can be caused to be performed by security server 305 on each of virtual machines 1 (310) and 3 (320), for instance using agents (e.g., 350, 355). The example task can attempt to confirm, for example, the operating system of the appliance, authenticate to the appliance (e.g., over SMB), confirm remote registry access is working/permitted at the appliance, determine the operating system of the appliance being scanned, and determine the service pack level of the system being scanned. Such actions can be performed, in some instances, by an agent (e.g., 350, 355) loaded onto the respective virtual machine. In other instances, some scans and information used in a security task can be performed by the virtual machine manager 340 via a query to the virtual machine manager 340 from the security server 305 over an API of the virtual machine manager 340.

Continuing with the immediate example, an interface of the virtual machine manager 340 can be used to authenticate to target virtual machine guests (e.g., 310, 320) of the system managed by the virtual machine manager. Agents can be uploaded to each of virtual machines 1 (310) and 3 (320), the agents including logic to perform at least portions of the example memory corruption vulnerability task. The uploaded agents can then be used to collect registry, file, and policy setting data from the host virtual machine and analyze values for vulnerabilities, missing patches, policy compliance violations, and other issues. For instance, the security task (and corresponding agent) can further check if the service pack level of the appliance is within a range of vulnerable service packs for the discovered operating system, determine the install path of key affected files, such as determining the location of "%systemroot%." The file version(s) of shared operating system libraries (e.g., DLL(s)) affected by the vulnerability can be then determined remotely, for instance, by reading the version from the proper location in the file, such as, in this example, a vulnerable/affected files list. Further, if the operating system, service pack, and file version indicate the system is vulnerable to the vulnerability, then result (and/or reporting data) can be generated indicating that the particular virtual appliance is vulnerable to the particular vulnerability, among other examples.

Figure 4:
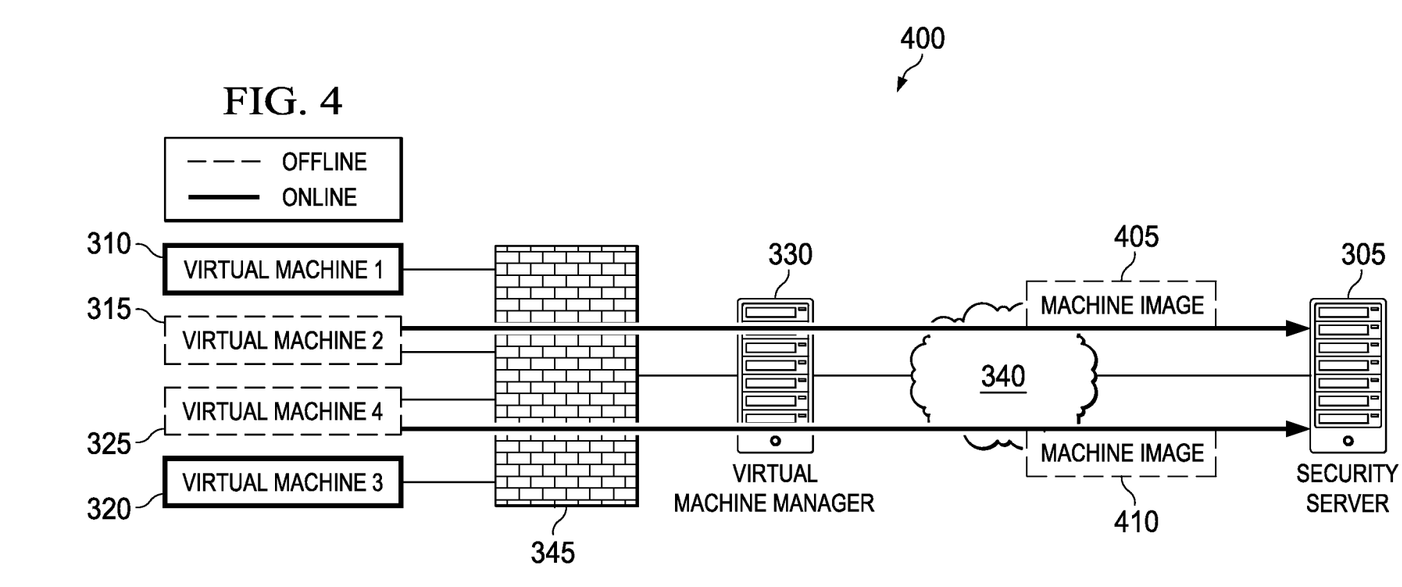
FIG. 4 illustrates other examples of performing example security tasks on virtual resources in accordance with at least some embodiments

FIG. 4 shows a schematic representation 400 of potential techniques for performing example security tasks on offline virtual machines detected, for example, through virtual machine data 335 collected through one or more virtual machine manager 330 interfaces or APIs. In one example, upon determining that virtual machines 2 (315) and 4 (325) are offline, security server 305 can access virtual machines 2 (315) and 4 (325) through interfaces of the virtual machine manager 330 and obtain machine images 405, 410 of the respective virtual machines (i.e., 315, 325). Security server 305 can then read the collected images 405, 410 to perform various security assessments on data included in the images describing attributes and conditions of the offline virtual machines 315, 325. Further, in some instances, security server 305 can be adapted to emulate or simulate offline virtual machine as running, or online, using the collected images 405, 410. Using these simulations, security server 305 can perform additional security tasks that would otherwise demand a running a virtual machine to complete.

In one particular illustrative example, security server 305 can use a virtual disk API of the virtual machine manager 330 to mount a virtual image of an offline virtual machine and read files of the offline virtual machine (e.g., virtual machines 2 (315) and 4 (325) or other virtual machines managed by the virtual machine manager 330). In addition, or alternatively, an offline registry API of the virtual machine manager can be used to read and/or collect registry files from the offline virtual machines. The security server 305 can thereby collect registry, file, and policy setting values from the images and files obtained over the virtual machine manager 330 API(s) and then analyze these values for vulnerabilities, missing patches, policy compliance violations, and other issues. For instance, machine images (including registry files) can be accessed and analyzed to perform security tasks including the example memory corruption vulnerability security task discussed above and other security tasks that can be performed on both online and offline virtual machines (as well as real computing appliances) using security server 305.

Figure 5:
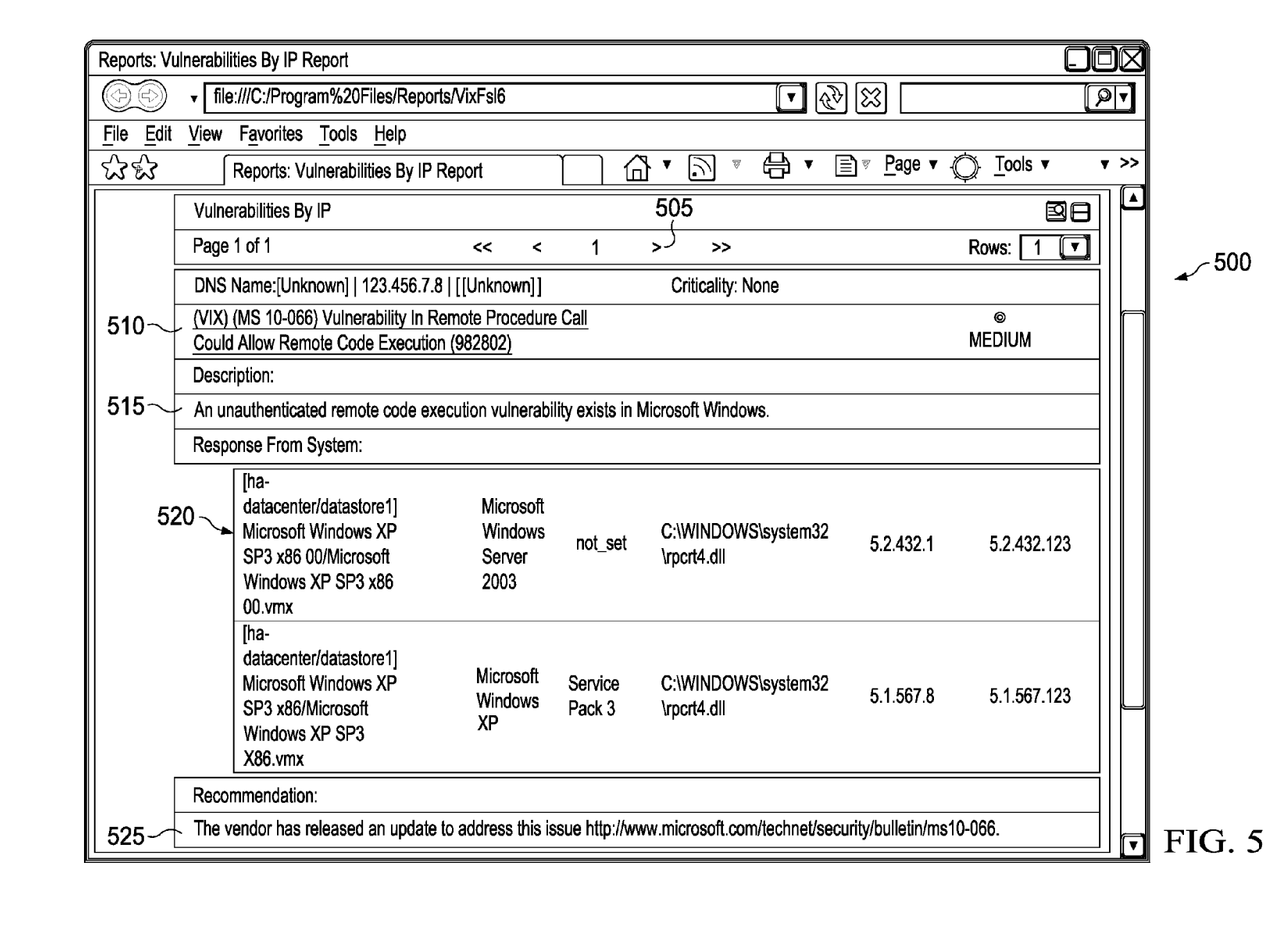
FIG. 5 illustrates an example screenshot of an example security tool used in performing one or more security tasks relating to virtual resources in accordance with one embodiment.

Turning to FIG. 5, an example screenshot 500 is shown presented in connection with at least one example implementation of a security tool adapted to perform one or more security tasks on virtual appliances, including virtual machines. In this example, screenshot 500 can present results of one or more security tasks performed on one or more particular virtual machines (i.e., with virtual machines with IP addresses 5.1.567.8 and 5.2.432.1). The user interface screenshot 500 can present findings in a vulnerability manager report. For instance, in the example of FIG. 5, the reporting data findings can show that a vulnerability was found on two guest virtual appliances on a shared host server (i.e., with IP address 123.456.7.8). Additionally, the interface can allow a user (e.g., through control 505) to scroll through additional issues and events that have been identified through the performance of various security tasks. Further information can also be displayed pertaining to and detailing the vulnerabilities detected in the example of FIG. 5. For example, a particular issue can be identified 510 together with an indication of the seriousness or priority of the issue. In the example of FIG. 5, reporting data identifies the detection of a "vulnerability in remote procedure call could allow remote code execution," having a "medium" priority level. Additional fields 515 can be provided offering a more detailed description of the detected issue together with appliance-specific results 520. Further, upon identifying an issue in the virtual appliances, one or more recommended resolutions or actions (e.g., at 525) can be identified as potentially addressing the identified issue. In some implementations, detected issues can be assigned (for instance, using controls in the user interface of screenshot 500) to one or more administrative personnel members for further investigation or resolution.

Figure 6:
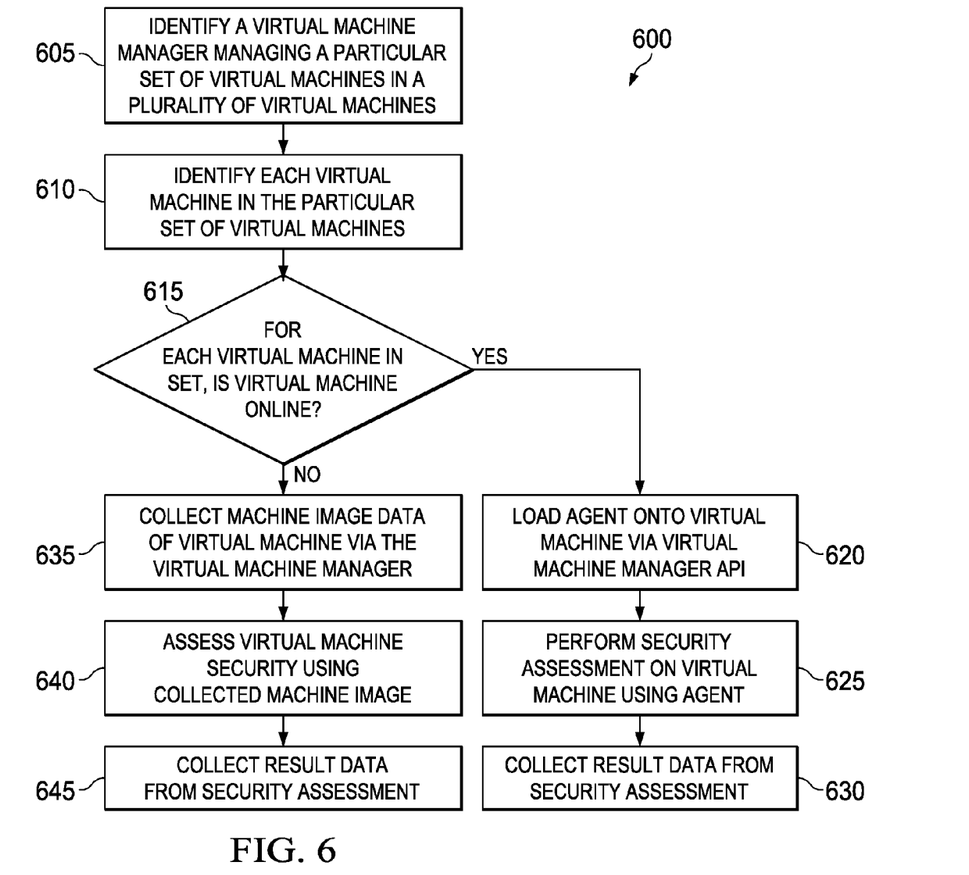
FIG. 6 is a simplified flowchart illustrating example operations associated with at least some embodiments of the system.

FIG. 6 is a simplified flowchart 600 illustrating an example technique for performing one or more security tasks on a system including one or more virtual appliances, such a virtual machines. A virtual machine manager can be identified 605 that manages one or more virtual appliances in a set of virtual machines. The virtual machine manager can additionally manage other virtual machine outside of the set. Each virtual machine in the particular set can be identified 610, together with information describing aspects and conditions of the respective virtual machine. From the information, it can be determined 615 whether the respective virtual machine is online or offline. If the virtual machine is online, then an agent can be loaded 620 onto the virtual machine via an interface of the virtual machine manager and a security task can be performed 625 on the virtual machine using the agent. Result data can be collected 630 from the agent in connection with the performance 625 of the security task.

In instances where it is determined 615 that a particular virtual machine is offline, machine image data for the virtual machine can be collected 635 via one or more interfaces of the virtual machine manager. Such image data can include registry files. The virtual machine images can then be read and used to assess 640 security of the corresponding virtual machine. Additionally, result data can be collected 645 from the security assessment of the image data.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, that are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
    identifying each virtual machine in a set of virtual machines managed by a virtual machine manager;
    determining, for each virtual machine in the set, whether the respective virtual machine is online, wherein a first subset is determined to be offline and a second subset is determined to be online;
    collecting, for each virtual machine in the first subset, a machine image of the virtual machine via the virtual machine manager;
    causing a security tool authenticated by the virtual machine manager to assess security of each virtual machine in the first subset from the collected machine images;
    loading a respective agent, via an application programming interface (API) of the virtual machine manager, on each virtual machine in the second subset, wherein each agent comprises logic to perform one or more security assessments within the corresponding online virtual machine and the API permits selective access to firewalled protected virtualized resources in the second subset of virtual machines; and
    using the agents loaded on the virtual machines in the second subset to assess security of the corresponding virtual machines.

2. The method of claim 1, wherein identifying each virtual machine includes:
    sending a query to the virtual machine manager for information for the set of virtual machines; and
    receiving identification data, from the virtual machine manager, identifying each virtual machine in the set of virtual machines in response to the query.

3. The method of claim 2, wherein the identification data includes identification, for each virtual machine in the set of virtual machines, of whether the virtual machine is online.

4. The method of claim 2, wherein at least one of the query or identification data is communicated over an API of the virtual machine manager.

5. The method of claim 1, wherein the machine images of offline virtual machines in the set are sent via an API of the virtual machine manager.

6. The method of claim 1, further comprising collecting result data reporting results of the security assessment of the at least one online virtual machine, wherein the result data is collected from the agent over the API of the virtual machine manager.

7. The method of claim 1, wherein the agent is removed automatically at conclusion of the security assessment of the at least one online virtual machine.

8. The method of claim 1, wherein the set is a subset of the plurality of virtual machines managed by the virtual machine manager and the set comprises less than all of the plurality of virtual machines.

9. The method of claim 1, further comprising collecting result data from the security assessment of the offline virtual machines.

10. The method of claim 9, wherein the offline virtual machines include a plurality of offline virtual machines and the result data describes virtual-machine-specific security conditions for each of the plurality of offline virtual machines.

11. The method of claim 10, further comprising generating a virtual-machine-specific report for each of the plurality of offline virtual machines based at least in part on collected result data.

12. The method of claim 1, wherein assessing security of the offline virtual machines from the collected images includes reading each image file to identify security characteristics of each virtual machine in the offline virtual machines.

13. The method of claim 1, wherein assessing security of the offline virtual machines from the collected images further includes simulating operation of each offline virtual machine based on data in the corresponding image of the respective virtual machine.

14. The method of claim 1, wherein the plurality of virtual machines are firewalled.

15. The method of claim 1, further comprising authenticating, at the virtual machine manager, a security assessment tool.

16. The method of claim 1, wherein the security assessment of the offline virtual machines includes remedying at least one of a security vulnerability or policy violation detected for a particular one of the offline virtual machines before the particular virtual machine resumes online operation.

17. The method of claim 1, wherein the logic comprises logic to perform scans of the corresponding virtual machine to determine characteristics indicating one or more vulnerabilities of the virtual machine.

18. At least one non-transitory, machine-accessible storage medium having instructions stored thereon, the instructions when executed on a machine, cause the machine to:
 identify each virtual machine in a set of virtual machines managed by a particular virtual machine manager;
 determine, for each virtual machine in the set of virtual machines, whether the respective virtual machine is online, wherein a first subset is determined to be offline and a second subset is determined to be online;
 collect, for each virtual machine in the first subset, a machine image of the virtual machine via the particular virtual machine manager;
 cause a security tool authenticated by the virtual machine manager to assess security of each virtual machine in the first subset from the collected machine images;
 load, on each virtual machine in the second subset, a respective agent, via an application programming interface (API) of the virtual machine manager, wherein each agent comprises logic to perform one or more security assessments within the corresponding online virtual machine and the API permits selective access to firewalled protected virtualized resources in the second subset of virtual machines; and
 direct the agents loaded on the virtual machines in the second subset to assess security of the corresponding virtual machines.

19. A system comprising:
at least one processor device;
at least one memory element; and
a security assessment module, adapted when executed by the at least one processor device to:
 identify each virtual machine in a set of virtual machines managed by a particular virtual machine manager;
 determine, for each virtual machine in the set of virtual machines, whether the respective virtual machine is online, wherein a first subset is determined to be offline and a second subset is determined to be online;
 collect, for each virtual machine in the first subset, a machine image of the virtual machine via the particular virtual machine manager;
 cause a security tool authenticated by the virtual machine manager to assess security of each virtual machine in the first subset from the collected machine images;
 load, via an API of the virtual machine manager, a respective agent, on each virtual machine in the second subset, wherein each agent comprises logic to perform one or more security assessments within the corresponding online virtual machine and the API permits selective access to firewalled protected virtualized resources in the second subset of virtual machines; and
 direct the agents loaded on the virtual machines in the second subset to assess security of the corresponding virtual machines.

* * * * *